(12) United States Patent
Chapman et al.

(10) Patent No.: US 6,600,151 B2
(45) Date of Patent: Jul. 29, 2003

(54) OPTICAL ENCODER ASSEMBLY WITH NON-ENGAGEABLE ENCODER HOUSING AND RECEIVER PLATE COMPRISING A THROUGH HOLE AND WINDOW

(75) Inventors: Alexander Lloyd Chapman, Lexington, KY (US); Adam Jude Ahne, Lexington, KY (US); Michael Anthony Marra, III, Lexington, KY (US); Christopher Alan Adkins, Lexington, KY (US); Barry Baxter Stout, Lexington, KY (US); Patrick Laurence Kroger, Versailles, KY (US); David Michael Cseledy, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 112 days.

(21) Appl. No.: 09/956,480

(22) Filed: Sep. 19, 2001

(65) Prior Publication Data

US 2003/0052261 A1 Mar. 20, 2003

(51) Int. Cl.[7] .................................................. G01D 5/34
(52) U.S. Cl. ............................ 250/231.13; 250/231.14; 33/707; 341/13
(58) Field of Search ............... 250/239, 231.13–231.18, 250/237 R; 341/11, 13, 31; 356/616–619; 33/706, 707

(56) References Cited

U.S. PATENT DOCUMENTS

| | | | |
|---|---|---|---|
| 3,900,732 A | 8/1975 | Costales | |
| 4,343,992 A | 8/1982 | Blaser | |
| 4,375,592 A | * 3/1983 | Cox et al. | ............... 250/231.16 |
| 4,475,034 A | 10/1984 | Maddox et al. | |
| 4,697,077 A | 9/1987 | Weber et al. | |
| 4,703,176 A | 10/1987 | Hahn et al. | |
| 4,712,005 A | 12/1987 | Savia | |
| 4,740,691 A | 4/1988 | Ushiyama | |
| 4,794,250 A | 12/1988 | Togami | |
| 4,933,636 A | 6/1990 | McGee | |
| 5,057,684 A | 10/1991 | Service | |
| 5,698,849 A | 12/1997 | Figueria, Jr. | |
| 5,701,007 A | 12/1997 | Figueria, Jr. | |
| 5,708,496 A | 1/1998 | Barnett et al. | |
| 5,859,425 A | 1/1999 | Mleinek et al. | |
| 5,923,032 A | 7/1999 | Carlson et al. | |
| 6,225,716 B1 | 5/2001 | Sies et al. | |

* cited by examiner

*Primary Examiner*—Stephone B. Allen
*Assistant Examiner*—Christopher W. Glass
(74) *Attorney, Agent, or Firm*—Thompson Hine, LLP

(57) ABSTRACT

An optical encoder assembly for an optical encoder for determining rotation of a rotatable shaft. An encoder housing is non-engageable with the shaft. A receiver plate is attached to the encoder housing, has a first side and a substantially opposing second side, and has a through hole and a window both extending from the first side to the second side, wherein the through hole is engageable with the shaft. An encoder mask is attached to the first side of the receiver plate, has a shaft hole engageable with the shaft, and has a mask grating positioned over the window. A light emitter is aligned to face the first side of the receiver plate and is positioned over the mask grating. A light detector is attached to the second side of the receiver plate and is positioned over the window.

22 Claims, 12 Drawing Sheets

OPTICAL ENCODER ASSEMBLY WITH NON-ENGAGEABLE ENCODER HOUSING AND RECEIVER PLATE COMPRISING A THROUGH HOLE AND WINDOW

TECHNICAL FIELD

The present invention relates generally to encoders, and more particularly to an optical encoder assembly for an optical encoder for determining rotation of a rotatable shaft.

BACKGROUND OF THE INVENTION

Encoders include optical encoders which determine rotation of a rotatable shaft by calculating the angular position, angular velocity, and/or angular acceleration of the rotatable shaft. In numerous electromechanical systems, it becomes necessary to precisely determine and control the movement of a driven rotating shaft. Toward this end, optical encoders are often employed. They make use of a disk or codewheel which modulates radiation from an emitter. Detector(s) respond to this modulation by outputting voltage or current, which is used by a control algorithm to change the input to a motor to achieve the desired shaft angular position, angular velocity, or angular acceleration. These optical encoders fall into two broad categories. The first category includes those encoders that are pre-assembled with a shaft section through the body or housing of the encoder and delivered as a complete package for attachment via couplers to the shaft that needs to be controlled. In this case, the alignment between the codewheel, mask, sensors, and shaft has already been set at the vendor's factory.

The second category of encoders, sometimes referred to as modular encoders, does not have a shaft section built into the body or housing of the encoder, so some form of secondary operation is conventionally required to precisely set the codewheel in relation to the mask and emitter/detector prior to securing the codewheel to the shaft. Modular encoders are typically hand-assembled in place during the fabrication of the rest of the machine that goes with the shaft. Currently, modular optical encoders require additional steps after initial assembly to precisely set the gap between the codewheel, mask (if used), and the emitter/detector. The conventional manner of calibration involves usage of special gauges and instrumentation to iteratively set the codewheel/mask and codewheel/sensor relationship. Another known method eliminates such iteration and involves the usage of a tool to temporarily hold all components in rigid alignment until final fasteners are tightened (U.S. Pat. No. 5,701,007) or uses a linear (U.S. Pat. No. 5,057,684) or a rotating (U.S. Pat. No. 4,794,250) cam that is twisted or plunged, thereby setting the proper mask-to-codewheel and codewheel-to-sensor alignment. In the above three methods, final usage of an auxiliary tool to fasten the proper codewheel to the shaft is required.

What is needed is an optical encoder assembly which during assemblage of its parts automatically sets the proper gaps between the parts without requiring the use of any extra tools.

SUMMARY OF THE INVENTION

A first expression of a first embodiment of the invention is for an optical encoder assembly for an optical encoder for determining rotation of a rotatable shaft. The optical encoder assembly includes an encoder housing, a first subassembly, and a second subassembly. The encoder housing is non-engageable with the shaft. The first subassembly includes a receiver plate and an encoder mask. The receiver plate is attached to the encoder housing, has a first side and a substantially opposing second side, and has a through hole and a window both extending from the first side to the second side, wherein the through hole is engageable with the shaft. The encoder mask is attached to the first side of the receiver plate, has a shaft hole engageable with the shaft, and has a mask grating positioned over the window. The second subassembly is attached to the encoder housing and includes a light emitter and a light detector. The light emitter is aligned to face the first side of the receiver plate and is positioned over the mask grating. The light detector is attached to the second side of the receiver plate and is positioned over the window.

In one example, an optical encoder includes the previously-described optical encoder assembly and also includes an encoder codewheel attached to and rotatable with the shaft, radially extending from the shaft to the mask grating, and axially positioned between the light emitter and the mask grating.

Several benefits and advantages are derived from the first expression of a first embodiment of the invention. By having the encoder mask attached to the first side of a receiver plate and the receiver plate attached to the encoder housing, proper positioning of the encoder mask with respect to the housing is assured. By having the light detector attached to the second side of the receiver plate and the receiver plate attached to the encoder housing, proper positioning of the light detector with respect to the housing is assured. In one construction, a socket on the encoder housing surrounds the light emitter and seats on the rim of the light emitter to assure proper positioning of the light emitter with respect to the housing. In the same or another construction which also includes the example having the codewheel, the encoder housing has alignment bumps and the first side of the receiver plate has alignment surface bumps to assure proper positioning of the codewheel which is axially positioned between the alignment bumps and the alignment surface bumps.

DETAILED DESCRIPTION

Figure 1:
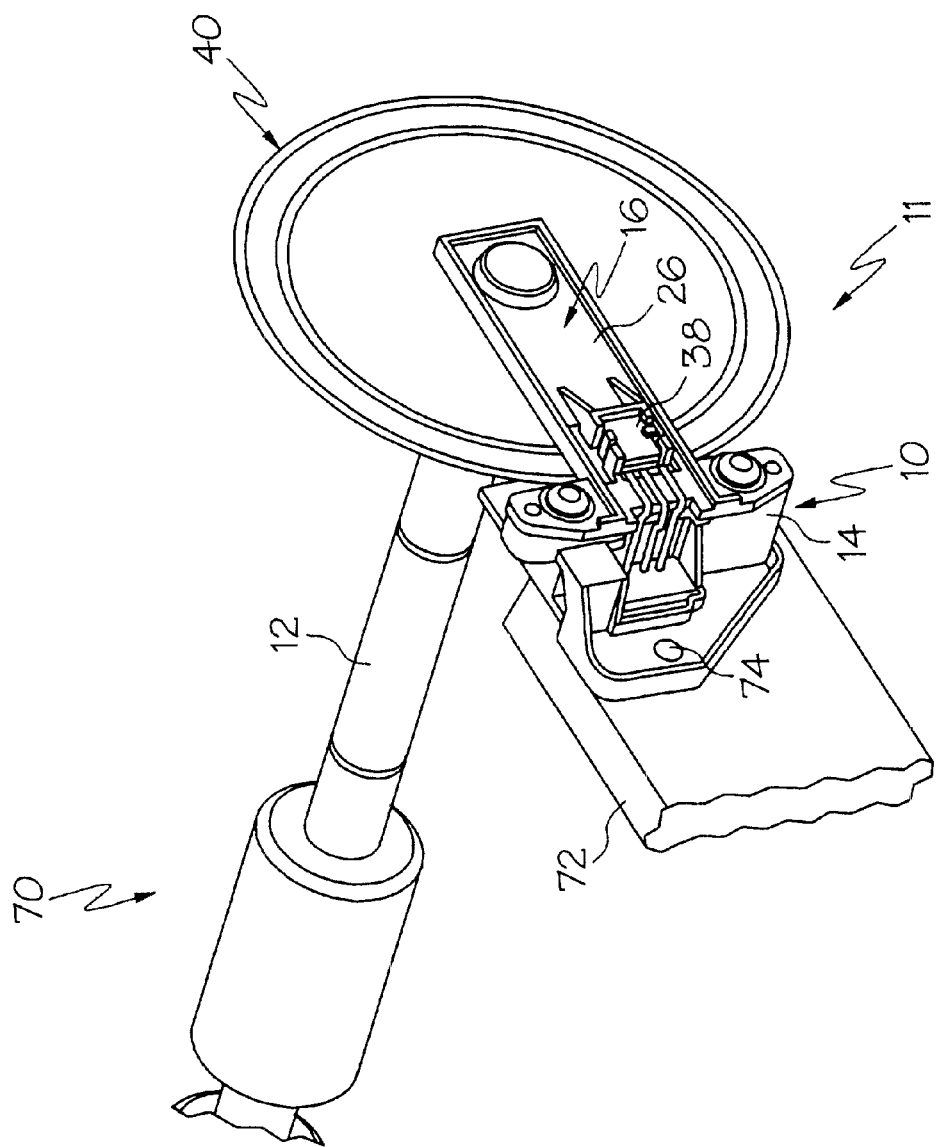
FIG. 1 is a perspective view of a first embodiment of the optical encoder assembly of the invention and an encoder codewheel together defining an optical encoder for determining rotation of a shaft, wherein the codewheel is shown attached to the shaft, and wherein the encoder housing is shown attached to a printer frame.
Figure 2:
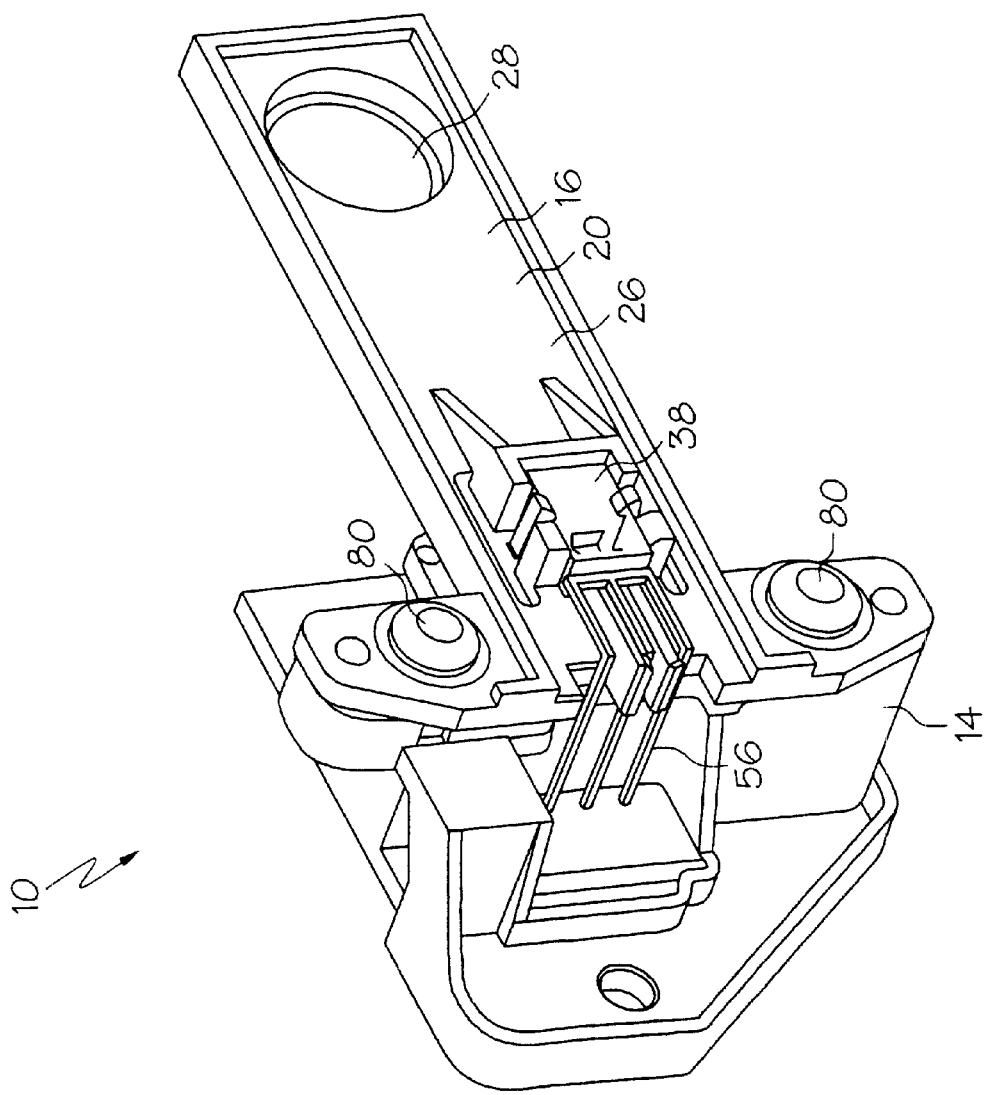
FIG. 2 is a perspective view of the optical encoder assembly of FIG. 1.

A first expression of a first embodiment of the invention shown in the FIGS. 1–12 is for an optical encoder assembly 10 (seen in FIGS. 1 and 2) for an optical encoder 11 (seen in FIG. 1) for determining rotation of a rotatable shaft 12 (seen in FIG. 1) and includes an encoder housing 14 (seen in FIGS. 1–2 and 8–12), a first subassembly 16 (seen in FIGS. 1–3, 5 and 12) and a second subassembly 18 (seen in FIGS. 6 and 8–11). The encoder housing 14 is non-engageable with the shaft 12. The first subassembly 16 includes a receiver plate 20 (seen in FIGS. 2–5 and 12), and an encoder mask 22 (seen in FIGS. 3 and 5). The receiver plate 20 is attached to the encoder housing 14, has a first side 24 (seen in FIGS. 3–5) and a substantially opposing second side 26 (seen in FIGS. 1, 2 and 12), and has a through hole 28 (seen in FIGS. 2, 5 and 12) and a window 30 (seen in FIGS. 4 and 5) both extending from the first side 24 to the second side 26, wherein the through hole 28 is engageable with the shaft 12. The encoder mask 22 is attached to the first side 24 of the receiver plate 20, has a shaft hole 32 (seen in FIG. 5) engageable with the shaft 12, and has a mask grating 34 (seen in FIGS. 3 and 5) disposed over the window 30. The second subassembly 18 is attached to the encoder housing 14 and includes a light emitter 36 (seen in FIGS. 6–8, 10 and 12) and a light detector 38 (seen in FIGS. 1, 2, 6, 9, 10 and 12). The light emitter 36 is aligned to face the first side 24 of the receiver plate 20 and is disposed over the mask grating 34. The light detector 38 is attached to the second side 26 of the receiver plate 20 and is disposed over the window 30.

Figure 3:
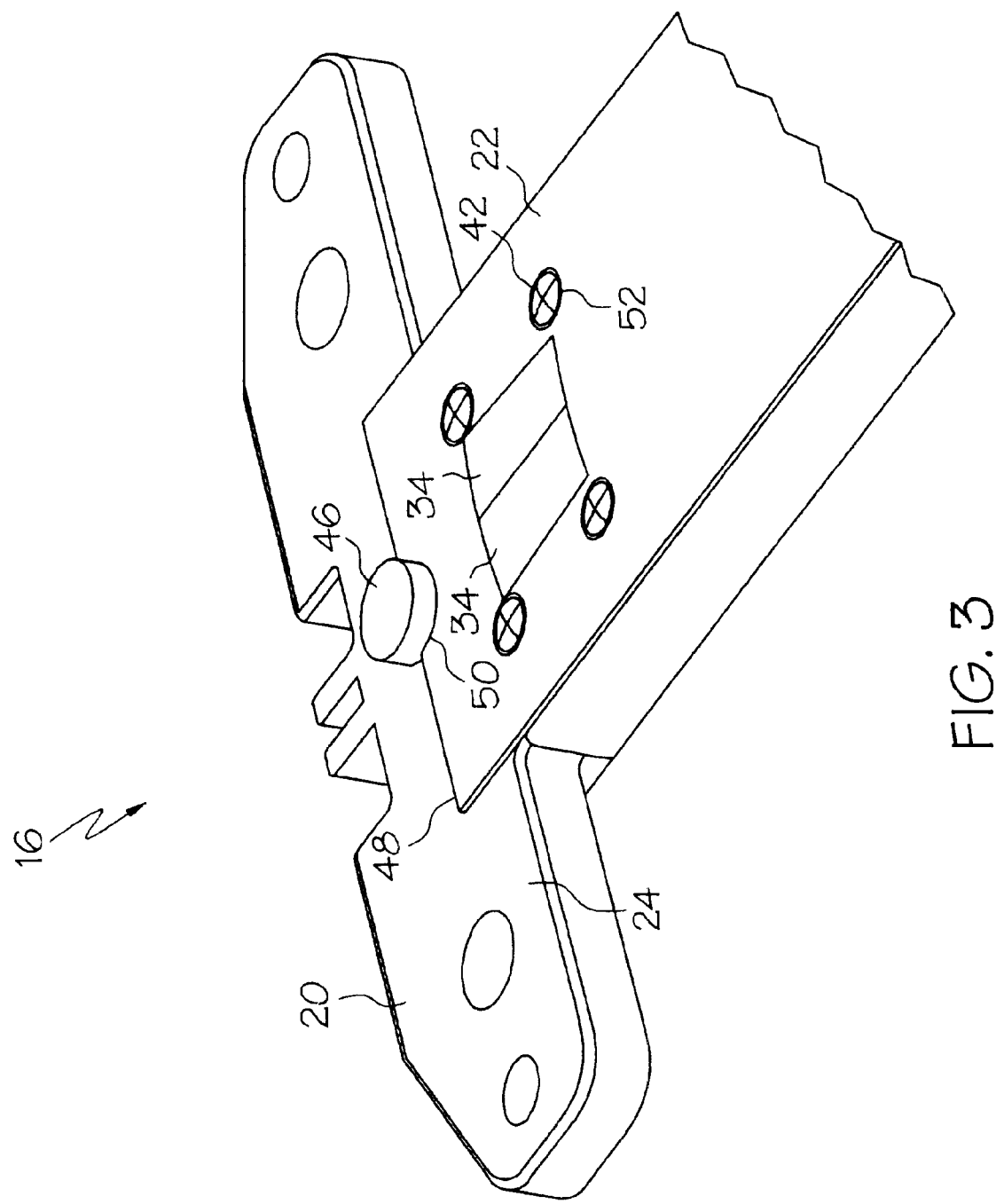
FIG. 3 is a perspective view of a portion of the first subassembly of the optical encoder assembly of FIG. 2 including the receiver plate and the encoder mask.
Figure 4:
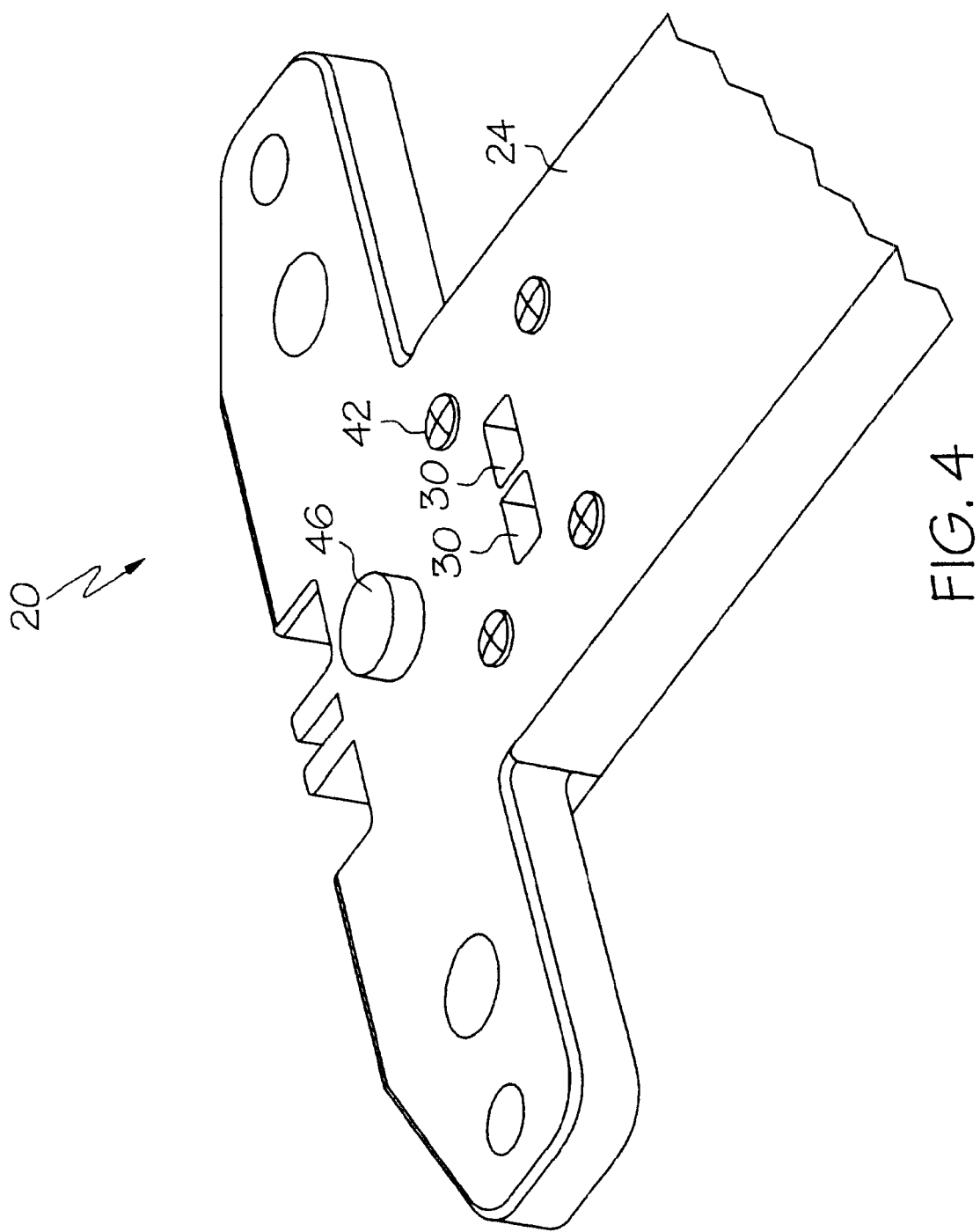
FIG. 4 is a perspective view of a portion of the receiver plate of FIG. 3.
Figure 5:
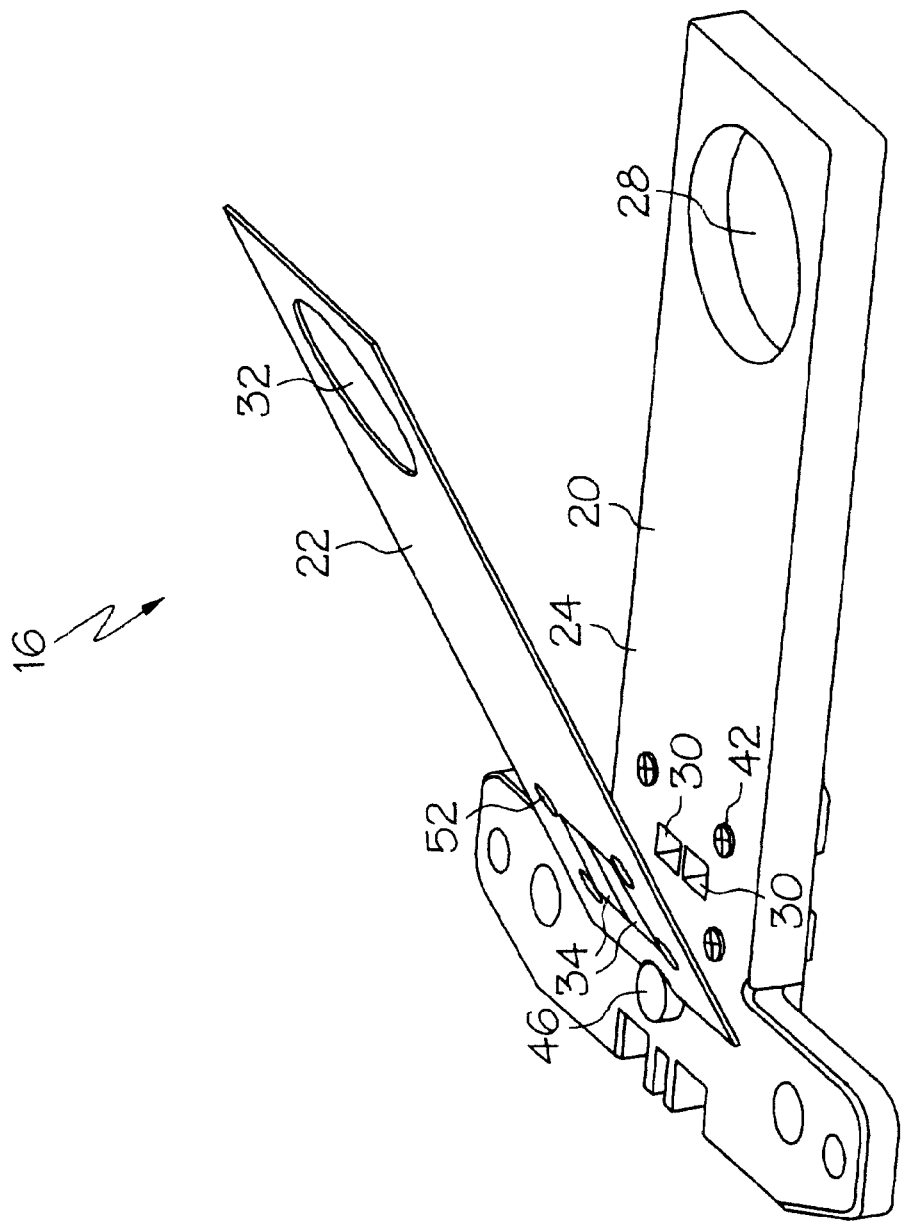
FIG. 5 is a perspective view of the encoder mask of FIG. 3 being assembled to the receiver plate of FIG. 3.

In one variation, to allow dual channel operation, the window 30 has separated right and left window portions as seen in FIG. 4, and the mask grating 34 has split right and left grating portions as seen in FIG. 3 as can be appreciated by the artisan.

In one example, the optical encoder 11 includes the optical encoder assembly 10 and also includes an encoder codewheel 40 (seen in FIG. 1) attached to and rotatable with the shaft 12, radially extending from the shaft 12 to the mask grating 34, and axially positioned between the light emitter 36 and the mask grating 34. In one construction, the first side 24 of the receiver plate 20 has a plurality of alignment surface bumps 42 (seen in FIGS. 3–5), the encoder housing 14 has a plurality of alignment bumps 44 (seen in FIG. 10), and the encoder codewheel 40 is axially positioned between the alignment surface bumps 42 and the alignment bumps 44. It is noted that the encoder housing 14 is not engaged with the shaft 12 as the encoder housing 14 does not surround or contact the shaft 12. It is also noted that the term "shaft" includes any shaft extension or extensions coupled or otherwise attached to the shaft 12.

In the same or a different example, the first side 24 of the receiver plate 20 has a protruding alignment peg 46 (seen in FIGS. 3–5), and an edge 48 (seen in FIG. 3) of the encoder mask 22 has an alignment cutout 50 (seen in FIG. 3) matching a portion of, and engaged with, the alignment peg 46. In one variation, the receiver plate 20 and the encoder mask 22 are substantially of equal width from the mask grating 34 and the window 30 to the through hole 28 and the shaft hole 32. In one modification, the window 30 has four corners, the first side 24 of the receiver plate 20 has an alignment surface bump 42 proximate each corner, the encoder mask 22 has four alignment holes 52 (seen in FIGS. 3 and 5), and each alignment surface bump 42 extends through an associated alignment hole 52.

In the same or a different example, the second subassembly 18 includes a printed circuit board 54 (seen in FIGS. 6 and 8–11) attached to the encoder housing 14, the light emitter 36 is attached to the printed circuit board 54, and the light detector 38 is connected to the printed circuit board 54 by a wire lead 56 (seen in FIGS. 2, 6 and 8–11). In one variation, the light emitter 36 has a base rim 58 (seen in FIGS. 6 and 7), and the encoder housing 14 has an alignment socket 60 (seen in FIG. 8) surrounding the light emitter 36 and seated on the base rim 58. In one modification, the base rim 58 has a flat 62 (seen in FIG. 7), and the alignment socket 60 has an alignment flat 64 (seen in FIG. 8) engaged with the flat 62 of the base rim 58.

In the same or different example, the encoder housing 14 has a plurality of alignment pins 66 (seen in FIGS. 9, 10 and 12), the receiver plate 20 has a matching plurality of alignment openings 68 (seen in FIGS. 3–5 and 12), and the alignment pins 66 are engaged in the alignment openings 68.

In one construction, the light detector 38 is attached to the second side 26 of the receiver plate 20 by a snap fit. It is noted that the previously-described examples, constructions, variations and modifications can be applied separately or in any combination to the first expression of the first embodiment of the invention shown in the figures.

A second expression of the first embodiment of the invention shown in the FIGS. 1–12 is for an optical encoder assembly 10 (seen in FIGS. 1 and 2) for an optical encoder 11 (seen in FIG. 1) for determining rotation of a rotatable shaft 12 (seen in FIG. 1) of a printer 70 having a frame 72 (only a portion of the printer and frame being shown in FIG. 1). A non limiting example of a printer is an inkjet printer. A non-limiting example of a rotatable shaft of a printer is a feedroll shaft. The optical encoder assembly 10 includes an encoder housing 14 (seen in FIGS. 1–2 and 8–12), a first subassembly 16 (seen in FIGS. 1–3, 5 and 12) and a second subassembly 18 (seen in FIGS. 6 and 8–11).

In the second expression, the encoder housing 14 is directly attachable to the frame 72 (such as by a screw 74) and is non-engageable with the shaft 12. The first subassembly 16 includes a receiver plate 20 (seen in FIGS. 2–5 and 12), and an encoder mask 22 (seen in FIGS. 3 and 5). The receiver plate 20 is directly attached to the encoder housing 14, has a first side 24 (seen in FIGS. 3–5) and a substantially opposing second side 26 (seen in FIGS. 1, 2 and 12), and has a through hole 28 (seen in FIGS. 2, 5 and 12) and a window 30 (seen in FIGS. 4 and 5) both extending from the first side 24 to the second side 26, wherein the through hole 28 extends beyond the encoder housing 14 and is engageable with the shaft 12. The first side 24 faces substantially toward the encoder housing 14, and the second side 26 faces substantially away from the encoder housing 14. The encoder mask 22 is directly attached (such as by being glued) to the first side 24 of the receiver plate 20, has a shaft hole 32 (seen in FIG. 5) engageable with the shaft 12, and has a mask grating 34 (seen in FIGS. 3 and 5) disposed over the window 30.

Figure 6:
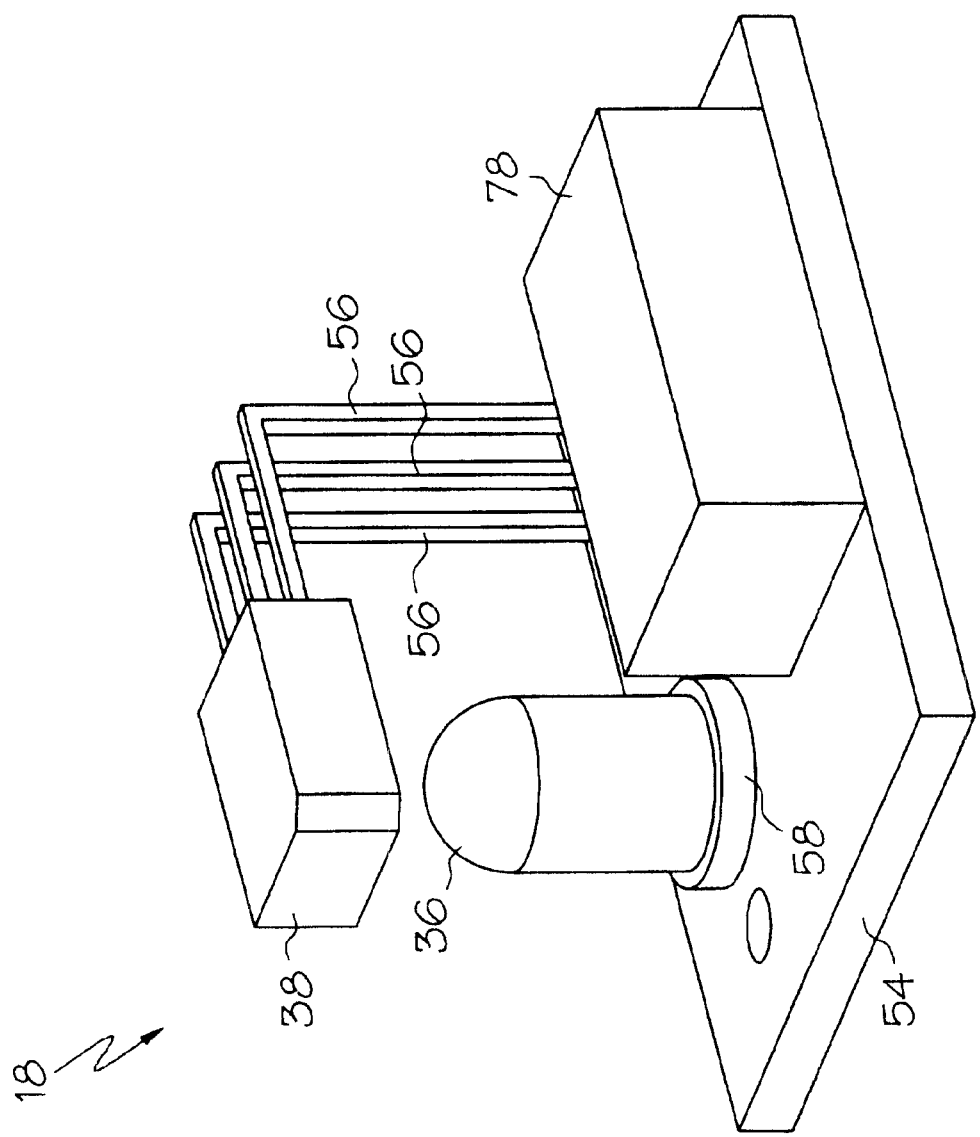
FIG. 6 is a perspective view of the second subassembly of the optical encoder assembly of FIG. 2 including the printed circuit board, the light emitter, and the light detector.
Figure 7:
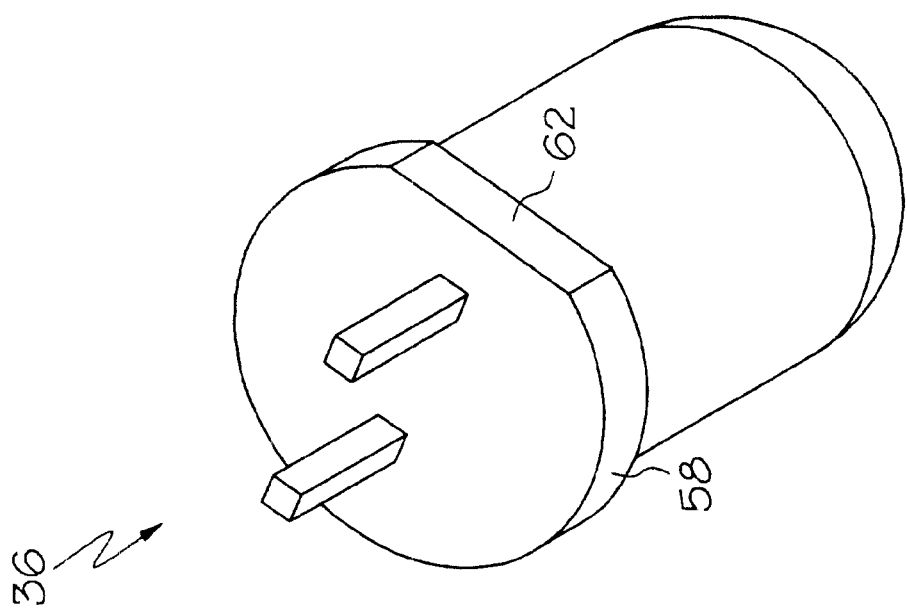
FIG. 7 is a perspective view of the underside of the light emitter of FIG. 6.
Figure 8:
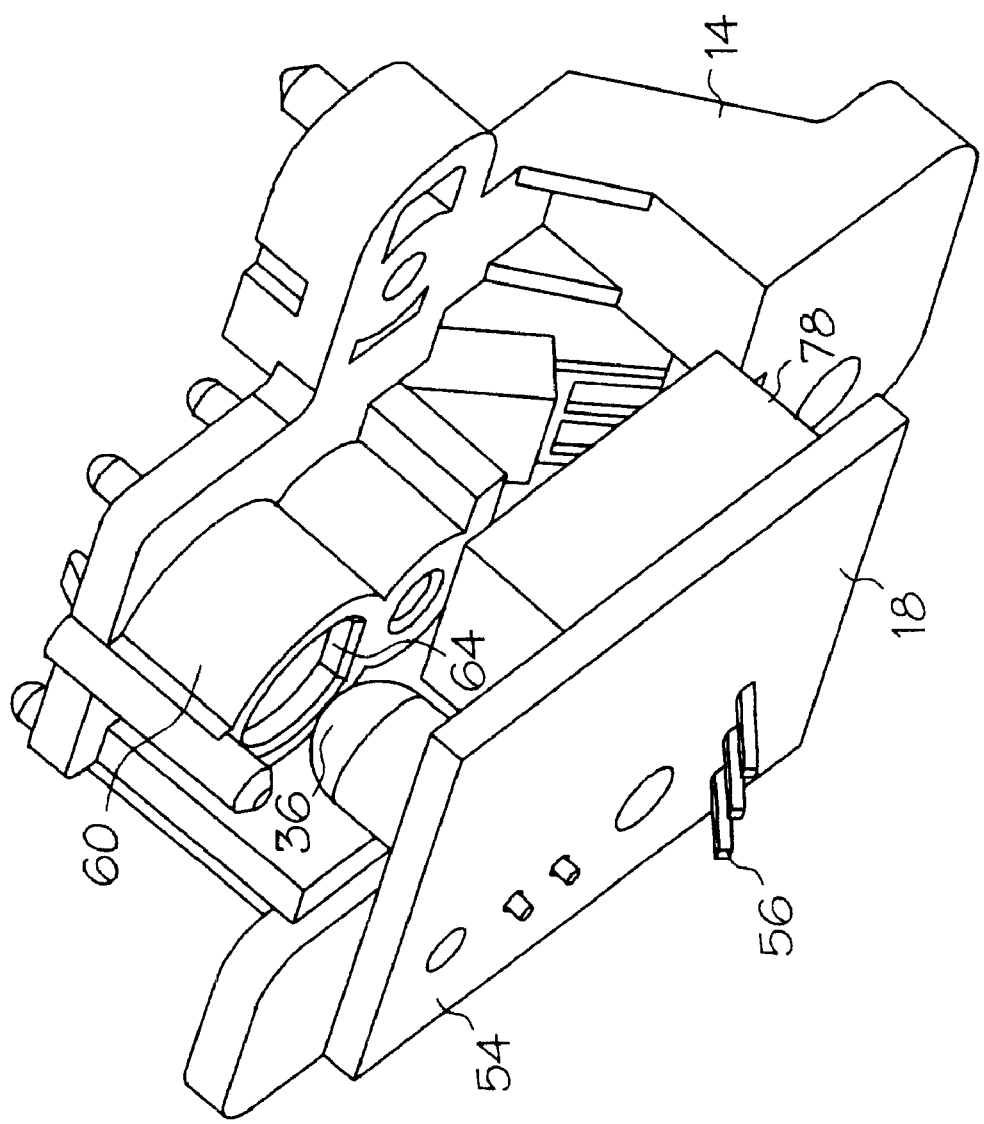
FIG. 8 is a perspective view of the second subassembly of FIG. 6 being attached to the encoder housing of the optical encoder assembly of FIG. 2 showing the alignment socket of the encoder housing about to surround the light emitter of the second subassembly.
Figure 9:
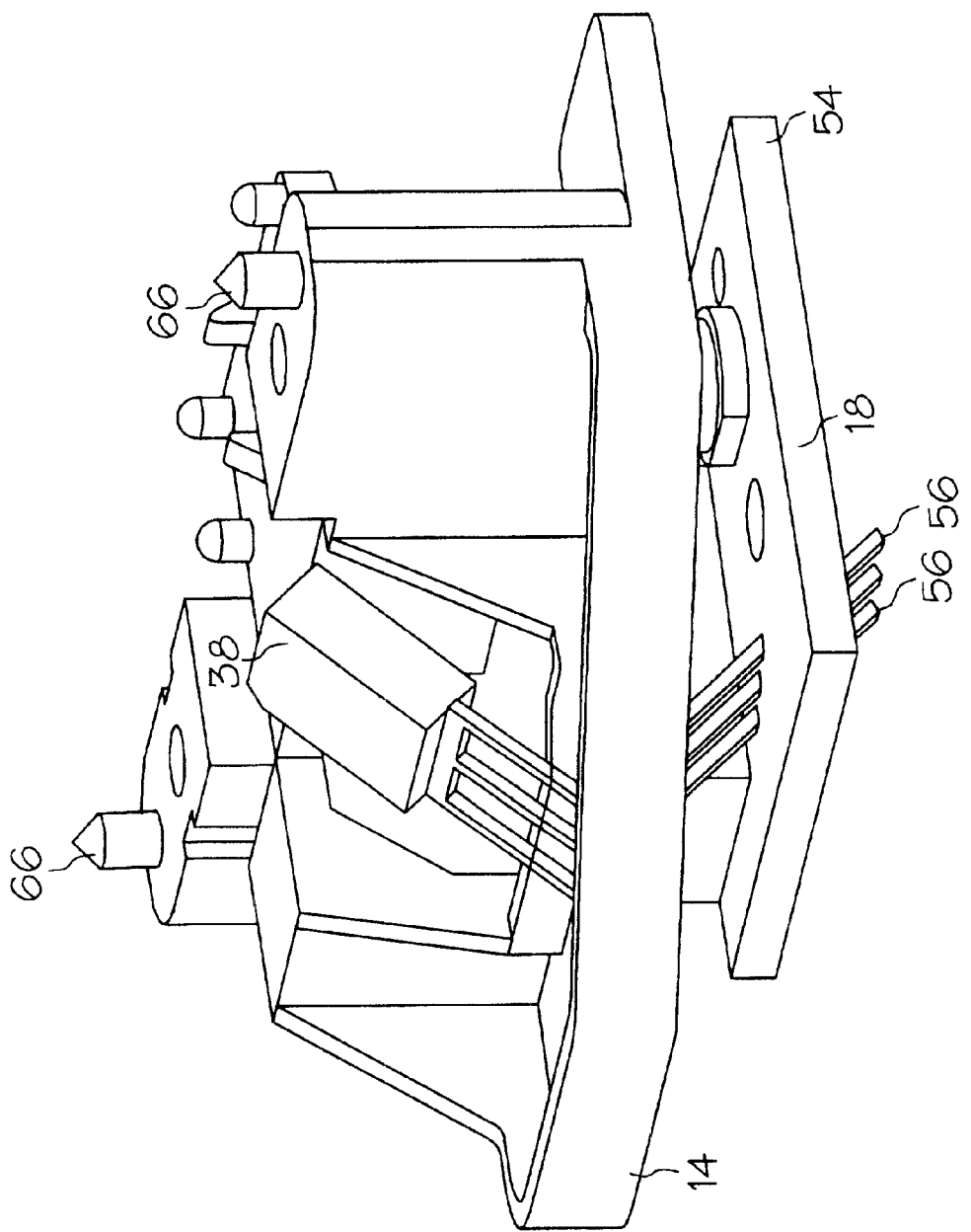
FIG. 9 is a different perspective view of the assemblage of FIG. 8.
Figure 10:
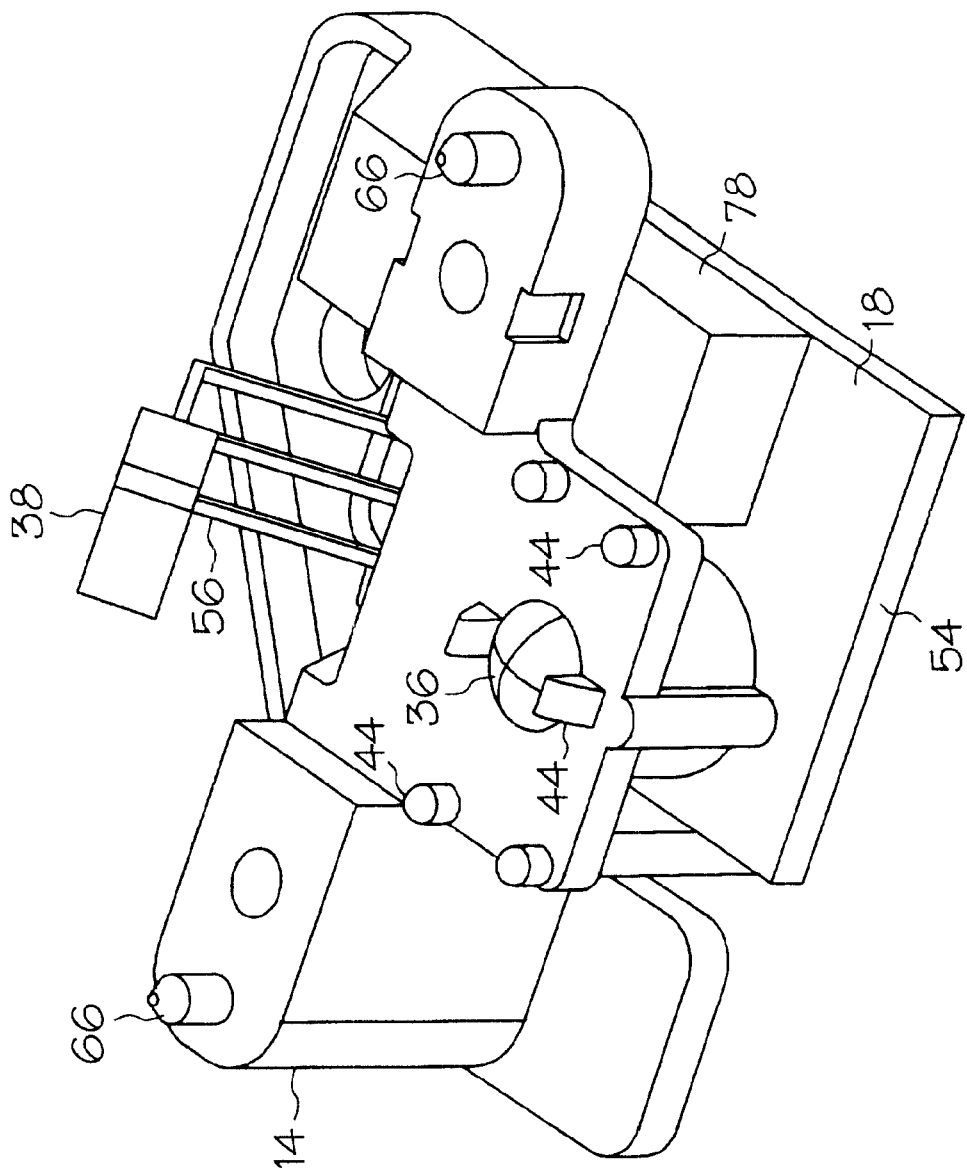
FIG. 10 is a different perspective view of the assemblage of FIG. 8 but with the printed circuit board attached to the encoder housing and with the light emitter protruding above the alignment socket of the encoder housing.
Figure 11:
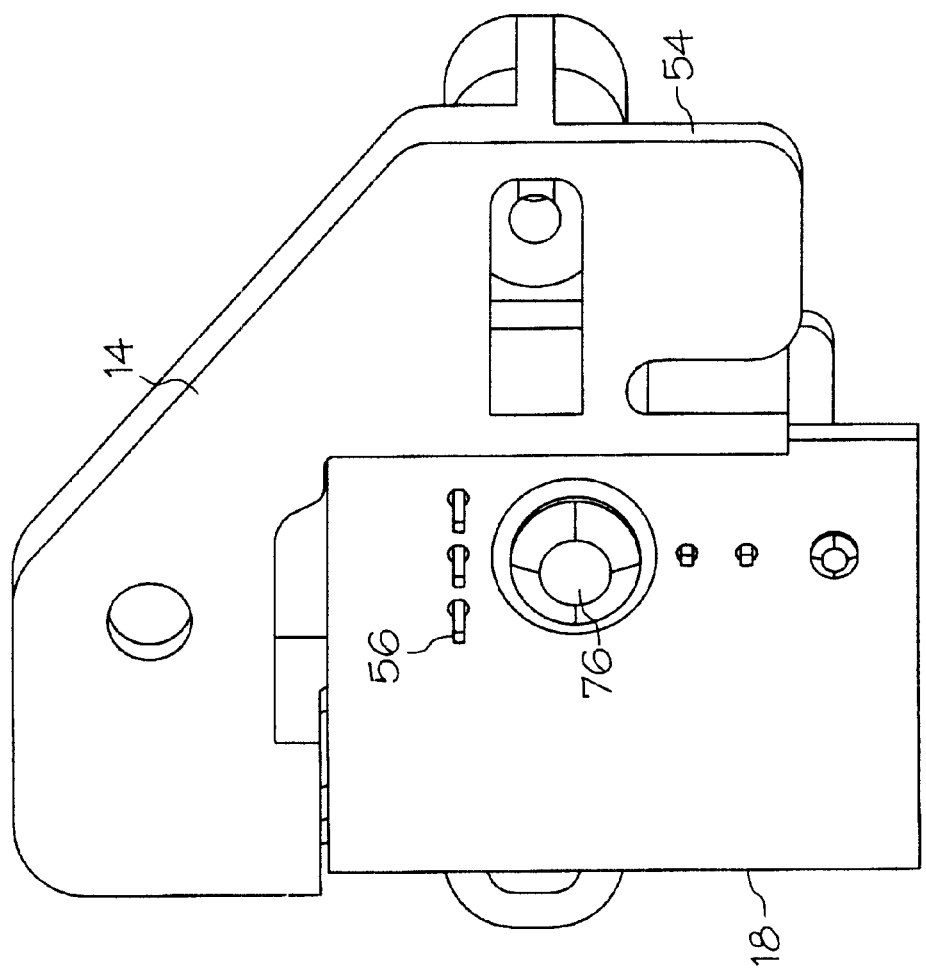
FIG. 11 is an underside perspective view of FIG. 10.
Figure 12:
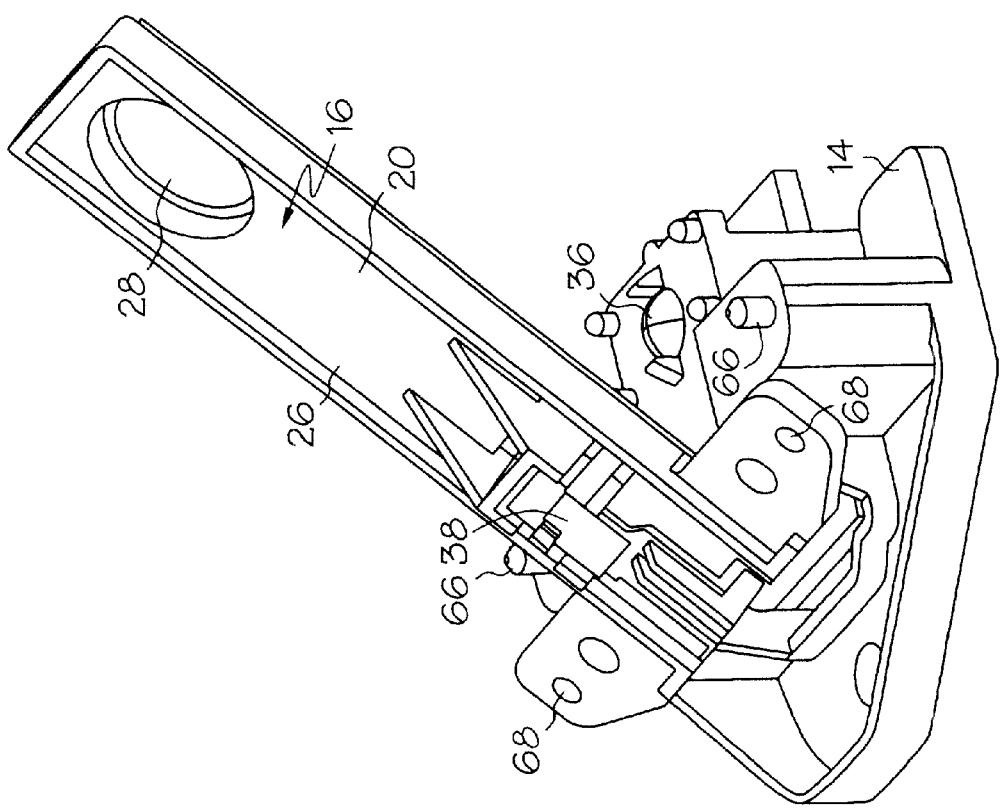
FIG. 12 is a topside perspective view of the assemblage of FIG. 10 but with the addition of the receiver plate, wherein the light detector has been attached to the receiver plate and wherein the receiver plate is being attached to the encoder housing.

In the second expression, the second subassembly 18 has a printed circuit board 54 (seen in FIGS. 6–11), a light emitter 36 (seen in FIGS. 6–8, 10 and 12) and a light detector 38 (seen in FIGS. 1, 2, 6, 9, 10 and 12). The printed circuit board 54 is directly attached (such as by a screw 76 seen in FIG. 11) to the encoder housing 14. The light emitter 36 is directly attached to the printed circuit board 54 (such as by being wave-soldered), is aligned to face the first side 24 of the receiver plate 20, and is disposed over the mask grating 34. The light detector 38 is connected to the printed circuit board 54 by a wire lead 56 and is directly attached to the second side 26 of the receiver plate 20 (such as by a press fit) and is disposed over the window 30. In one design, there are three wire leads 56 as best shown in FIG. 6).

It also is noted that the examples, constructions, variations and modifications of the previously-described first expression of the first embodiment of the invention shown in the figures are equally applicable alone or in any combination to the second expression of the first embodiment of the invention.

The following discussion describes a method for robust assembly of the first embodiment of the optical encoder assembly (and the optical encoder) shown in the figures. It is noted that this embodiment is a low-cost, hand assembled, complete optical encoder assembly (and optical encoder) for attachment to a shaft hub or gear. The components of the complete optical encoder assembly (and optical encoder) are self-aligning, with no tools, calibration, or other secondary operation required for robust operation after initial assembly. It is also noted that this embodiment eliminates those conventional secondary operations to calibrate the system and makes final securing of the codewheel hub to the shaft unnecessary. Hand assembly of the system components is all that is required to automatically set the relationship between the codewheel, encoder mask, and light emitter without any extra tools. There are numerous features on each of the individual parts as well as the nature of the whole assembly process which allows the optical encoder assembly (and the optical encoder) to be assembled and work robustly without special calibration tools, assembly fixtures, or secondary calibration steps.

Step 1 in the method is to align and adhere the encoder mask 22 to the receiver plate 20 and involves the use of a radial datuming feature (i.e., the alignment peg 46) on the first side 24 of the receiver plate 20 (see FIG. 4). This ensures that the mask grating's 34 optical diameter is lined up consistently from part-to-part in relation to the receiver plate window 30 openings (see FIGS. 3 and 5). Excessive radial misalignment of the encoder mask 22 to the receiver plate 20 would mean the center of the receiver plate windows and subsequently the light detector (e.g., photodiode) windows would not line up consistently with the encoder mask optical diameter from part-to-part. On the other hand, excessive lateral misalignment would mean that some of the light coming through the mask grating's left or right opening would spill over onto the other receiver plate window opening, causing crosstalk between the two separate channels. To ensure proper lateral alignment, the encoder mask 22 is substantially the exact width of the receiver plate 20 (see FIG. 3). While the operator is adhering (e.g., gluing) the mask to the receiver plate, it is easy to keep this good edge-to-edge alignment by visual inspection and tactile feedback during the assembly process (see FIG. 4).

It is noted that during this step, an additional key alignment feature for receiver plate/mask radial and lateral alignment is the set of four alignment surface bumps 42 on the first side 24 of the receiver plate 20 that protrude through the alignment holes 52 of the encoder mask 22 (see FIG. 3). They work in such a way that they also do not allow for too much lateral or radial misalignment of the mask grating 34 to receiver plate window 30. Nonetheless, since these bumps are very short, it is possible to adhere the encoder mask 22 on the receiver plate 20 without properly situating it over the bumps. If the operator does this inadvertently, the shaft hole 32 on the encoder mask 22 will overlap the through hole 28 in the receiver plate 20. When this happens, it will be impossible for the operator to put the receiver plate/encoder mask first subassembly 16 onto the shaft 12 (such as the feedroll shaft of an inkjet printer), alerting the operator to a faulty subassembly.

Step 2 in the method is mounting the light detector 38 (such as a photodiode), the cable connector 78 (seen in FIGS. 6 and 8–10), and the light emitter 36 (such as a light emitting diode) to the single printed circuit board 54. One of the unique features of the optical encoder assembly 10 is the use of only a single printed circuit board 54 for all of the electronics of the encoder, including the light emitter 36, the light detector 38, and cable connector 78. They are wave soldered into the printed circuit board 54. Note that the light emitter wire leads 56 are bent substantially ninety degrees (see FIG. 6) for ease of hand insertion of the light detector into the receiver plate 20. This is covered in more detail in step 4.

Step 3 in the method is aligning and attaching the second subassembly 18 to the encoder housing 14. One of the characteristics of a light emitting diode (LED) type of light emitter 36 is a bond wire within the lens which blocks a portion of emitted light. Consequently, the emitted light pattern is slightly asymmetric. Many manufacturers of LEDs flatten a portion of the LED rim (creating a flat such as the flat 62 of the base rim 58 of the light emitter 36 shown in FIG. 7) to denote polarity of the protruding leads. One of the key features of the optical encoder assembly 10 is the use of the LED flat portion as a datuming feature when assembling the second subassembly 18 to the encoder housing 14 (see FIG. 8). This means less variation of the intensity of the emitted light seen by each channel of the light detector 38 from part-to-part due to radial misalignment. The light detector 38 is temporarily bent out of the way by hand in preparation for attaching the second subassembly 26 to the encoder housing 14, wherein axial alignment is ensured by the intimate contact of the base rim 58 of the LED with the encoder housing alignment socket 50, so there is less part-to-part variation in the distance that the LED is seated into the encoder housing LED socket (see FIG. 8). Final securing of the second subassembly 18 to the encoder housing 14 is achieved with the screw 76 driven by hand through the rear of the printed circuit board 54 into the encoder housing 14 (see FIG. 11).

Step 4 in the method is aligning and securing the light detector 38 to the first subassembly 16. Another feature of the optical encoder assembly 10 is the alignment of the light detector 38 to the second side 26 of the receiver plate 20 of the first subassembly 16. This is accomplished by the operator snapping the light detector 38 into place on the second side 26 of the receiver plate 20 (see FIG. 12). The act of snapping the light detector 38 into place assures the operator that it is aligned properly with respect to the receiver plate 20. Since the encoder mask 22 has been aligned with respect to the receiver plate 20 in step 1, the light detector 38 and the encoder mask 22 are now properly aligned as well.

Step 5 in the method is aligning and attaching the receiver plate 20 to the encoder housing 14. There are two alignment pins 66 on the encoder housing 14 that fit into two alignment openings 68 on the receiver plate 20, ensuring that the proper receiver plate/encoder housing alignment occurs when pressed together by hand (see FIG. 12). This ensures good lateral alignment of the light detector 38 relative to the receiver plate/encoder mask/light detector package (as opposed to radial alignment, detailed in step 3). Two screws 80 (see FIG. 2) tightened by hand ensure proper intimate contact between the receiver plate 20 and the encoder housing 14 necessary for proper axial spacing between the light emitter 36, the light detector 38, and the encoder mask 22.

Step 6 of the method is attaching the codewheel 40 to the shaft 12 and aligning the optical encoder assembly 10 (see FIG. 2) to the shaft 12 and the codewheel 40 to create the optical encoder 11 (seen in FIG. 1). The codewheel 40 is attached to the shaft 12 in a conventional manner. Then the completed optical encoder assembly 10 (see FIG. 2) is placed over the codewheel 40 and slipped over the end of the shaft 12 as well (see FIG. 1). Good alignment of the optical encoder assembly 10 relative to the shaft 12 is assured by tight clearance between the shaft 12 and the encoder mask 22. The small clearance for the codewheel 40 between the four alignment surface bumps 42 of the first side 24 of the receiver plate 20 and the six alignment bumps 44 of the encoder housing 14 ensures that the codewheel 40 is also properly axially spaced relative to the light emitter 36, light detector 38, and the encoder mask 22. Good radial alignment between the codewheel 40 and the encoder mask 22 is ensured by the fact that both the codewheel 40 and the encoder mask 22 are datumed relative to the shaft via intimate contact.

Step 7 of the method is attaching the optical encoder assembly 10 to the frame 72 of the printer 70 (as seen in FIG. 1). The completed optical encoder assembly 10 is secured to the frame 72 by one or more screws 74 (one of which is seen in FIG. 1) through a hole in the encoder housing 14.

Several benefits and advantages are derived from the first and/or second expressions of the first embodiment of the invention. By having the encoder mask attached to the first side of a receiver plate and the receiver plate attached to the encoder housing, proper positioning of the encoder mask with respect to the housing is assured. By having the light detector attached to the second side of the receiver plate and the receiver plate attached to the encoder housing, proper positioning of the light detector with respect to the housing is assured. In one construction, a socket on the encoder housing surrounds the light emitter and seats on the rim of the light emitter to assure proper positioning of the light emitter with respect to the housing. In the same or another construction which also includes the example having the codewheel, the encoder housing has alignment bumps and the first side of the receiver plate has alignment surface bumps to assure proper positioning of the codewheel which is axially positioned between the alignment bumps and the alignment surface bumps. Several other benefits and advantages have been previously discussed and arise from other previously-described alignment features of the first embodiment of the optical encoder assembly.

The foregoing description of several expressions of a first embodiment of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

What is claimed is:
1. An optical encoder assembly, for an optical encoder for determining rotation of a rotatable shaft, comprising:
   a) an encoder housing non-engageable with the shaft;
   b) a first subassembly including:
      (1) a receiver plate attached to the encoder housing, having a first side and a substantially opposing second side, and having a through hole and a window both extending from the first side to the second side, wherein the through hole is engageable with the shaft, and
      (2) an encoder mask attached to the first side of the receiver plate, having a shaft hole engageable with the shaft, and having a mask grating disposed over the window; and
   c) a second subassembly attached to the encoder housing and including a light emitter and a light detector, wherein the light emitter is aligned to face the first side of the receiver plate and is disposed over the mask grating, and wherein the light detector is attached to the second side of the receiver plate and is disposed over the window.

2. An optical encoder comprising the optical encoder assembly of claim 1 and also comprising an encoder codewheel attached to and rotatable with the shaft, radially extending from the shaft to the mask grating, and axially positioned between the light emitter and the mask grating.

3. The optical encoder of claim 2, wherein the first side of the receiver plate has a plurality of alignment surface bumps, wherein the encoder housing has a plurality of alignment bumps, and wherein the encoder codewheel is axially positioned between the alignment surface bumps and the alignment bumps.

4. The optical encoder assembly of claim 1, wherein the first side of the receiver plate has a protruding alignment peg and wherein an edge of the encoder mask has an alignment cutout matching a portion of and engaged with the alignment peg.

5. The optical encoder assembly of claim 4, wherein the receiver plate and the encoder mask are substantially of equal width from the mask grating and the window to the through hole and the shaft hole.

6. The optical encoder assembly of claim 5, wherein the window has four corners, wherein the first side of the receiver plate has an alignment surface bump proximate each corner, wherein the encoder mask has four alignment holes, and wherein each alignment surface bump extends through an associated alignment hole.

7. The optical encoder assembly of claim 1, wherein the second subassembly includes a printed circuit board attached to the encoder housing, wherein the light emitter is attached to the printed circuit board, and wherein the light detector is connected to the printed circuit board by a wire lead.

8. The optical encoder assembly of claim 7, wherein the light emitter has a base rim, and wherein the encoder housing has an alignment socket surrounding the light emitter and seated on the base rim.

9. The optical encoder assembly of claim 8, wherein the base rim has a flat, and wherein the alignment socket has an alignment flat engaged with the flat of the base rim.

10. The optical encoder assembly of claim 1, wherein the light detector is attached to the second side of the receiver plate by a snap fit.

11. The optical encoder assembly of claim 1, wherein the encoder housing has a plurality of alignment pins, wherein the receiver plate has a matching plurality of alignment openings, and wherein the alignment pins are engaged in the alignment openings.

12. An optical encoder assembly, for an optical encoder for determining rotation of a rotatable shaft of a printer having a frame, comprising:
  a) an encoder housing directly attachable to the frame and non-engageable with the shaft;
  b) a first subassembly including:
    (1) a receiver plate directly attached to the encoder housing, having a first side and a substantially opposing second side, and having a through hole and a window both extending from the first side to the second side, wherein the through hole extends beyond the encoder housing and is engageable with the shaft, wherein the first side faces substantially toward the encoder housing, and wherein the second side faces substantially away from the encoder housing, and
    (2) an encoder mask directly attached to the first side of the receiver plate, having a shaft hole engageable with the shaft, and having a mask grating disposed over the window; and
  c) a second subassembly having a printed circuit board, a light emitter, and a light detector, wherein the printed circuit board is directly attached to the encoder housing, wherein the light emitter is directly attached to the printed circuit board, is aligned to face the first side of the receiver plate and is disposed over the mask grating, wherein the light detector is connected to the printed circuit board by a wire lead, and wherein the light detector is directly attached to the second side of the receiver plate and is disposed over the window.

13. An optical encoder comprising the optical encoder assembly of claim 12 and also comprising an encoder codewheel attached to and rotatable with the shaft, radially extending from the shaft to the mask grating, and axially positioned between the light emitter and the mask grating.

14. The optical encoder of claim 13, wherein the first side of the receiver plate has a plurality of alignment surface bumps, wherein the encoder housing has a plurality of alignment bumps, and wherein the encoder codewheel is axially positioned between the alignment surface bumps and the alignment bumps.

15. The optical encoder assembly of claim 12, wherein the first side of the receiver plate has a protruding alignment peg and wherein an edge of the encoder mask has an alignment cutout matching a portion of and engaged with the alignment peg.

16. The optical encoder assembly of claim 15, wherein the receiver plate and the encoder mask are substantially of equal width from the mask grating and the window to the through hole and the shaft hole.

17. The optical encoder assembly of claim 16, wherein the window has four corners, wherein the first side of the receiver plate has an alignment surface bump proximate each corner, wherein the encoder mask has four alignment holes, and wherein each alignment surface bump extends through an associated alignment hole.

18. The optical encoder assembly of claim 12 wherein the light emitter has a base rim, and wherein the encoder housing has an alignment socket surrounding the light emitter and seated on the base rim.

19. The optical encoder assembly of claim 18, wherein the base rim has a flat, and wherein the alignment socket has an alignment flat engaged with the flat of the base rim.

20. The optical encoder assembly of claim 12, wherein the light detector is attached to the second side of the receiver plate by a snap fit.

21. The optical encoder assembly of claim 12, wherein the encoder housing has a plurality of alignment pins, wherein the receiver plate has a matching plurality of alignment openings, and wherein the alignment pins are engaged in the alignment openings.

22. An optical encoder assembly, for an optical encoder for determining rotation of a rotatable shaft of a printer having a frame, comprising:
  a) an encoder housing directly attachable to the frame and non-engageable with the shaft;
  b) a first subassembly including:
    (1) a receiver plate directly attached to the encoder housing, having a first side and a substantially opposing second side, and having a through hole and a window both extending from the first side to the second side, wherein the through hole extends beyond the encoder housing and is engageable with the shaft, wherein the first side faces substantially toward the encoder housing, and wherein the second side faces substantially away from the encoder housing, and
    (2) an encoder mask directly attached to the first side of the receiver plate, having a shaft hole engageable with the shaft, and having a mask grating disposed over the window; and
  c) a second subassembly having a printed circuit board, a light emitter, and a light detector, wherein the printed circuit board is directly attached to the encoder housing, wherein the light emitter is directly attached to the printed circuit board, is aligned to face the first side of the receiver plate and is disposed over the mask grating, wherein the light detector is connected to the printed circuit board by a wire lead, and wherein the light detector is directly attached to the second side of the receiver plate and is disposed over the window,
  wherein the first side of the receiver plate has a protruding alignment peg and wherein an edge of the encoder mask has an alignment cutout matching a portion of and engaged with the alignment peg,
  wherein the receiver plate and the encoder mask are substantially of equal width from the mask grating and the window to the through hole and the shaft hole,
  wherein the light emitter has a base rim, and wherein the encoder housing has an alignment socket surrounding the light emitter and seated on the base rim,
  wherein the base rim has a flat, and wherein the alignment socket has an alignment flat engaged with the flat of the base rim,
  wherein the light detector is attached to the second side of the receiver plate by a snap fit, and
  wherein the encoder housing has a plurality of alignment pins, wherein the receiver plate has a matching plurality of alignment openings, and wherein the alignment pins are engaged in the alignment opening.

* * * * *